(12) United States Patent
Tarumoto et al.

(10) Patent No.: US 12,241,775 B2
(45) Date of Patent: Mar. 4, 2025

(54) WEIGHING APPARATUS

(71) Applicant: Ishida Co., Ltd., Kyoto (JP)

(72) Inventors: Yoshinori Tarumoto, Ritto (JP); Shoko Tajiri, Ritto (JP); Kohei Hayashida, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 394 days.

(21) Appl. No.: 17/696,762

(22) Filed: Mar. 16, 2022

(65) Prior Publication Data

US 2022/0299357 A1 Sep. 22, 2022

(30) Foreign Application Priority Data

Mar. 18, 2021 (JP) ................................. 2021-045010

(51) Int. Cl.
| | | |
|---|---|---|
| *G01G 23/16* | (2006.01) | |
| *B65G 37/00* | (2006.01) | |
| *G01G 11/00* | (2006.01) | |

(52) U.S. Cl.
CPC ........... *G01G 23/16* (2013.01); *B65G 37/005* (2013.01); *G01G 11/00* (2013.01); *B65G 2203/0258* (2013.01)

(58) Field of Classification Search
CPC ........ G01G 23/16; G01G 11/00; G01G 23/10; G01G 19/035; G01G 23/163; G01G 19/52;
(Continued)

(56) References Cited

U.S. PATENT DOCUMENTS

| | | | | |
|---|---|---|---|---|
| 4,909,338 A | * | 3/1990 | Vitunic | ................. G01G 23/01 |
| | | | | 73/1.13 |
| 5,789,713 A | * | 8/1998 | Wakasa | ................. G01G 23/10 |
| | | | | 177/185 |

(Continued)

FOREIGN PATENT DOCUMENTS

| | | |
|---|---|---|
| CN | 103017877 A | 4/2013 |
| CN | 106068445 A | 11/2016 |

(Continued)

OTHER PUBLICATIONS

The extended European search report issued by the European Patent Office on Jul. 20, 2022, which corresponds to European Patent Application No. 22160300.4-1001 and is related to U.S. Appl. No. 17/696,762.

(Continued)

*Primary Examiner* — Jacques M Saint Surin
(74) *Attorney, Agent, or Firm* — Studebaker & Brackett PC

(57) ABSTRACT

A weighing apparatus includes: a transport unit capable of transporting an article; a weighing unit connected to the transport unit and configured to output an original signal related to a weight; and a weighing control unit configured to output a weighing value of the article by processing the original signal, wherein the weighing control unit is configured: to determine whether or not to adjust a zero point on the basis of a determination signal obtained by applying a first filter to the original signal; to generate an adjustment signal obtained by applying a second filter having more stages than the first filter to the original signal or the determination signal in a case where it is determined that the zero point is to be adjusted; and to perform adjustment of the zero point on the basis of the adjustment signal.

18 Claims, 8 Drawing Sheets

(58) Field of Classification Search
CPC ...... G01G 23/01; G01G 11/04; B65G 37/005; B65G 2203/0258
USPC .................................................. 177/245
See application file for complete search history.

(56) References Cited

U.S. PATENT DOCUMENTS

| | | | | |
|---|---|---|---|---|
| 6,271,484 B1* | 8/2001 | Tokutsu | ................. | G01G 23/10 |
| | | | | 177/25.18 |
| 6,373,001 B1* | 4/2002 | Kono | ................... | G01G 23/14 |
| | | | | 73/1.13 |
| 7,586,049 B2* | 9/2009 | Wurz | ..................... | G01G 11/00 |
| | | | | 702/155 |
| 10,126,162 B2* | 11/2018 | Chiba | ................... | G01G 11/00 |
| 11,566,933 B2* | 1/2023 | Kageyama | ........... | G01G 13/248 |
| 11,573,120 B2* | 2/2023 | Wu | ........................ | G01G 23/00 |
| 2011/0196877 A1* | 8/2011 | Sakagami | .............. | B65G 43/08 |
| | | | | 707/E17.084 |
| 2023/0296424 A1* | 9/2023 | Tarumoto | ............... | G01G 23/37 |
| | | | | 177/25.13 |

FOREIGN PATENT DOCUMENTS

| | | |
|---|---|---|
| EP | 3372963 A1 | 9/2018 |
| JP | H04-269630 A | 9/1992 |
| JP | H05-010812 A | 1/1993 |
| JP | 2005-147920 A | 6/2005 |
| JP | 2008-145122 A | 6/2008 |
| JP | 4781982 B2 | 9/2011 |
| JP | 2016-133415 A | 7/2016 |
| JP | 2016-156783 A | 9/2016 |
| JP | 2016-156784 A | 9/2016 |
| JP | 6521224 B2 | 5/2019 |
| JP | 2020-030058 A | 2/2020 |

OTHER PUBLICATIONS

Chen Shu-zhen and Yang Tao, "Improvement & Realization of the Zero-Phase Filter", Jun. 10, 2001, vol. 47, No. 3, pp. 373-376; with an English abstract on p. 376.

* cited by examiner

WEIGHING APPARATUS

TECHNICAL FIELD

The present disclosure relates to a weighing apparatus.

BACKGROUND

An example of a weighing apparatus is an apparatus that measures a weight of an article (an object to be weighed) conveyed by a transport conveyor. A weighing apparatus that includes a weighing means for outputting a weighing signal related to a weight of each of products sequentially loaded at a predetermined loading interval, a signal processing means for executing a filtering process in which a high frequency component is removed from the weighing signal with a first filter and a second filter having different filter characteristics from each other, and a weighing value calculating means for calculating a weighing value on the basis of the weighing signal subjected to the filtering process is disclosed in Japanese Patent No. 4781982.

This weighing apparatus further has a zero point correction means and calculates a zero point which is a reference of the weighing value on the basis of the weighing signal subjected to the filtering process to correct its zero point. The filter to be used for the filtering process is selected according to the loading interval of the articles, and filtering conditions of the second filter are variably set according to the loading interval. In Japanese Patent No. 4781982, the filtering process for adjusting the zero point is surely executed for the weighing signal even at a short loading interval.

SUMMARY

In the weighing apparatus described in Japanese Patent No. 4781982, the filtering process is performed on the weighing signal for a period corresponding to the loading interval. In a case where the zero point is adjusted within such an interval or the like, in order to improve the adjustment accuracy of the zero point, it is conceivable to perform multi-stage filtering process if possible (that is, to perform the filtering process for as long as possible) on an original signal. Here, in general, the longer the filtering process, the lower a responsiveness to the original signal. Therefore, when sudden noise (for example, noise generated by a collision of an operator with the weighing apparatus, occurrence of an earthquake, or the like) is included in the original signal, the noise may also be used for adjusting the zero point. In this case, when adjustment of the zero point is performed, the adjusted zero point may actually deviate from a real zero point.

An object of an aspect of the present disclosure is to provide a weighing apparatus capable of accurately performing adjustment of a zero point.

A weighing apparatus according to an aspect of the present disclosure includes: a transport unit capable of transporting an article; a weighing unit connected to the transport unit, the weighing unit being configured to output an original signal related to a weight; and a weighing control unit configured to output a weighing value of the article by processing the original signal, wherein the weighing control unit is configured: to determine whether or not to adjust a zero point on the basis of a determination signal obtained by applying a first filter to the original signal; to generate an adjustment signal obtained by applying a second filter having more stages than the first filter to the original signal or the determination signal in a case where it is determined that the zero point is to be adjusted; and to perform adjustment of the zero point on the basis of the adjustment signal.

According to this weighing apparatus, the weighing control unit first determines whether or not to adjust the zero point on the basis of the determination signal obtained by applying the first filter having a smaller number of stages than the second filter (that is, a filter having higher responsiveness than the second filter) to the original signal. As a result, the weighing control unit can accurately determine whether or not the original signal includes sudden noise. Then, the weighing control unit generates an adjustment signal obtained by applying a second filter having more stages than the first filter to the original signal or the determination signal in a case where it is determined that the zero point is to be adjusted. As a result, it is possible to perform adjustment of the zero point on the basis of the adjustment signal from which noise has been satisfactorily removed. Therefore, the above weighing apparatus can accurately perform adjustment of the zero point.

In a case where a peak included in the determination signal exceeds a predetermined threshold value, the weighing control unit may be configured to determine that the zero point is not to be adjusted and not to adjust the zero point until a predetermined time has elapsed from the determination. In this case, it is possible to adjust the zero point after the cause of the sudden noise is eliminated. Therefore, it is possible to more accurately perform adjustment of the zero point.

In a case where a peak included in the determination signal exceeds a predetermined threshold value, the weighing control unit may be configured to determine that the zero point is not to be adjusted and generate another determination signal obtained by applying the first filter to another original signal output after the determination signal is acquired. In this case, it is possible to adjust the zero point without using the original signal which may include sudden noise. Therefore, it is possible to more accurately perform adjustment of the zero point.

The weighing control unit may be configured: to specify a generation timing of a peak exceeding a predetermined threshold value among peaks included in the determination signal; to delete data generated during a predetermined period including the generation timing from the adjustment signal; and to perform adjustment of the zero point on the basis of the adjustment signal from which the data has been deleted. In this case, the zero point can be adjusted from the adjustment signal from which sudden noise has been removed in advance. Therefore, it is possible to more accurately perform adjustment of the zero point.

The first filter may not include a low-pass filter. In this case, since the time for applying the first filter to the original signal can be shortened, the determination signal is reliably generated even in a case where a period during which the original signal for adjusting the zero point can be acquired is short.

A time for applying the second filter to the original signal may be longer than a time for applying the first filter to the original signal. At least one of the first filter and the second filter may be configured by combining a plurality of digital filters. In this case, it is possible to more accurately perform adjustment of the zero point.

According to the aspect of the present disclosure, it is possible to provide a weighing apparatus capable of accurately performing adjustment of a zero point.

DETAILED DESCRIPTION

Hereinafter, an embodiment relating to an aspect of the present disclosure will be described in detail with reference to the drawings. In each figure, the same or corresponding parts are designated by the same reference signs, and duplicate description will be omitted.

Figure 1:
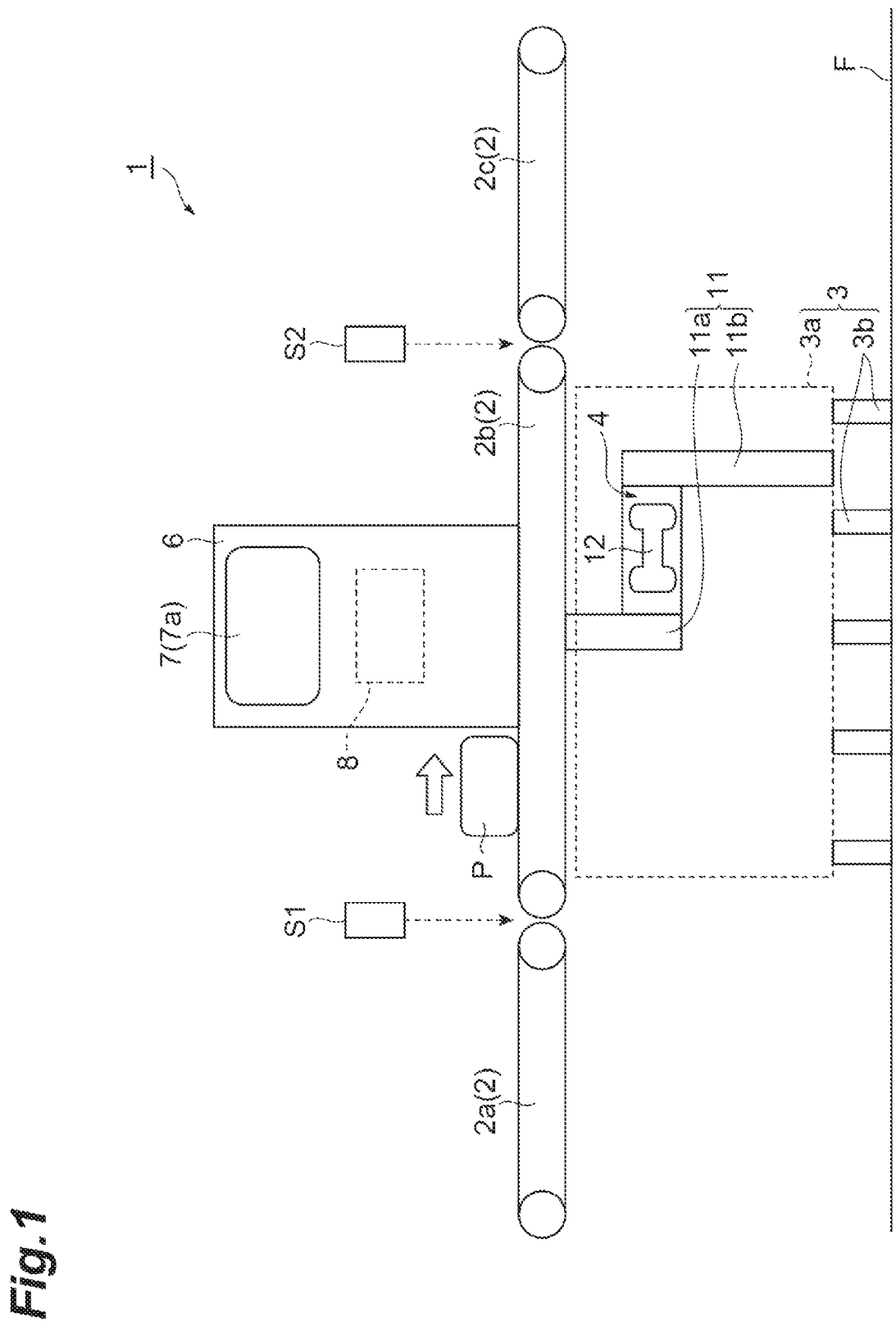
FIG. 1 is a schematic configuration view of a weighing apparatus according to an embodiment.

FIG. 1 is a schematic configuration view of a weighing apparatus according to the present embodiment. A weighing apparatus 1 shown in FIG. 1 is an apparatus that weighs an object to be measured while transporting the object in a direction of an arrow in FIG. 1 (hereinafter simply referred to as a "transport direction"). The weighing apparatus 1 is, for example, an apparatus disposed on a final line of a production line. The object to be measured is, for example, an article P having a long shape extending in the transport direction. The weighing apparatus 1 includes a transport unit 2, a frame 3, a weighing unit 4, and an operation unit 6.

The transport unit 2 is a conveyor that transports the article P in the transport direction and includes a first conveyor unit 2a, a second conveyor unit 2b, and a third conveyor unit 2c. Each of the first conveyor unit 2a, the second conveyor unit 2b, and the third conveyor unit 2c has, for example, a roller, a rotating body such as a motor, a transport belt, and the like. The first conveyor unit 2a, the second conveyor unit 2b, and the third conveyor unit 2c are disposed in order from an upstream side in the transport direction. That is, the second conveyor unit 2b is located between the first conveyor unit 2a and the third conveyor unit 2c in the transport direction. The first conveyor unit 2a is a conveyor that carries the article P into the second conveyor unit 2b. The first conveyor unit 2a may include, for example, a metal detector (not shown) or the like. The second conveyor unit 2b is a conveyor that carries the article P transported from the first conveyor unit 2a into the third conveyor unit 2c. The third conveyor unit 2c is a conveyor that carries the article P out of the second conveyor unit 2b. The third conveyor unit 2c includes, for example, a sorting machine (not shown) that sorts out an article P whose weight deviates from an appropriate range.

The weighing unit 4 is mounted on the second conveyor unit 2b. Therefore, the article P transported by the transport unit 2 is weighed on the second conveyor unit 2b. Further, sensors S1 and S2 for detecting the presence or absence of the article P are provided on an upstream side and a downstream side of the second conveyor unit 2b, respectively. Thereby, it can be easily determined whether or not the entire product P is located on the second conveyor unit 2b. In other words, on the basis of the detection results of the sensors S1 and S2, it can be easily determined whether the article P is not being transported by the second conveyor unit 2b (so-called idle operation).

The frame 3 is a member that accommodates the weighing unit 4 and is fixed to a floor F below the transport unit 2. The frame 3 has a main body 3a that accommodates the weighing unit 4 and a plurality of legs 3b located between the main body 3a and the floor F. In FIG. 1, the main body 3a is shown by a broken line.

The weighing unit 4 is a member that is connected to the transport unit 2 and outputs a signal related to a weight. The weighing unit 4 is located, for example, on an upstream side in the transport unit 2. The weighing unit 4 includes a strain-generating body 11 that receives compression and tension according to a load and a weighing cell 12 that weighs the article P located on the second conveyor unit 2b. The strain-generating body 11 has a movable rigid body portion 11a that supports the second conveyor unit 2b and a fixed rigid body portion 11b that is fixed to the frame 3. Each of the movable rigid body portion 11a and the fixed rigid body portion 11b is, for example, a member extending in a vertical direction. One end of the movable rigid body portion 11a is connected to an upstream end portion in the second conveyor unit 2b, and the other end of the movable rigid body portion 11a is connected to the weighing cell 12. One end of the fixed rigid body portion 11b is connected to the weighing cell 12, and the other end of the fixed rigid body portion 11b is connected to the main body 3a of the frame 3. Although not shown, in the weighing cell 12, a plurality of strain gauges elastically adhered to the strain-generating body 11 are connected to a Wheatstone bridge circuit.

The weighing cell 12 of the weighing unit 4 takes out an electric signal corresponding to the load transmitted from the strain-generating body 11 from the Wheatstone bridge circuit. The electric signal is an analog signal indicating the weighing result of the weighing cell 12. The analog signal includes, for example, a first analog signal used for weighing the article P and a second analog signal used for adjusting a zero point. Each of the first analog signal and the second analog signal is taken out while the transport unit 2 is in operation. Further, the first analog signal is taken out when the article P is completely disposed on the second conveyor unit 2b. On the other hand, the second analog signal is taken out when the article P is not disposed on the second conveyor unit 2b. In other words, the second analog signal is taken out during the idle operation of the transport unit 2. When the weighing apparatus 1 is disposed on the production line for manufacturing the article P, the second analog signal may be taken out when the article P is not disposed on the second conveyor unit 2b while the article P is being manufactured.

In a case where the analog signal generated by the weighing unit 4 is output to the operation unit 6 or the like, a network load in the weighing apparatus 1 is likely to be large. Therefore, in the present embodiment, the weighing unit 4 includes an A/D conversion section for converting an analog signal into a digital signal and outputs the digital signal to the operation unit 6 or the like as an original signal related to a weight. As a result, the network load in the weighing apparatus 1 can be reduced. Therefore, in the present embodiment, the weighing unit 4 outputs a first digital original signal based on the first analog signal and a second digital original signal based on the second analog signal, as the original signals.

The operation unit 6 is a member that operates the transport unit 2 and the weighing unit 4 and is installed in the vicinity of the second conveyor unit 2b, for example. The operation unit 6 includes a display interface 7 and a control unit 8.

The display interface 7 is a member (a display unit) that displays an image based on display information output from the control unit 8. The display interface 7 displays, for example, a weighing value indicating the measuring result of the weight of the article P, a waveform after a filtering process for the electric signal, a transport speed of the transport unit 2, a dimension of the article P in the transport direction, a transport frequency of the article P, a weighing pitch of the article P, and the like. In the present embodiment, the display interface 7 includes a touch panel 7a that functions as an external input unit. As a result, when the display interface 7 receives an input from an operator (a user), input information indicating an input content is output to the control unit 8. The input information is, for example, data related to the transport speed of the transport unit 2, the dimension of the article P in the transport direction, the type of the article P, the transport frequency of the article P, and the like. The transport frequency of the article P is set on the basis of a capacity of a production machine located upstream from the weighing apparatus 1, for example.

The weighing value of the article P is data obtained on the basis of data transmitted from the weighing unit 4 to the operation unit 6 (details will be described later). The weighing value is calculated by a known method. Further, the weighing pitch of the article P is calculated by the control unit 8 on the basis of the transport speed of the transport unit 2, the above-mentioned dimension of the article P, and the transport frequency of the article P.

The control unit 8 is a controller that controls each member included in the weighing apparatus 1 and is equipped in the operation unit 6. The control unit 8 is constituted by a central processing unit (CPU), a random access memory (RAM), a read only memory (ROM), and the like. The control unit 8 outputs, for example, an operation signal for controlling the transport speed of a designated transport unit 2 via the display interface 7 to the transport unit 2. Further, for example, in a case where the sorting machine is provided on the third conveyor unit 2c and the control unit 8 determines that the weight of the article P deviates from an appropriate range set in advance, the control unit 8 outputs the operation signal to the sorting machine so as to sort out (exclude from the line) the article P. The control unit 8 is a processing unit that not only controls each member included m the weighing apparatus 1 but also receives, calculates, and transmits various signals and records and reads various signals. As an example of the calculation of various signals by the control unit 8, the derivation of the weighing result of the article P is included. Therefore, the control unit 8 includes, for example, an unit for outputting a control signal of the transport unit 2, an unit for calculating the weighing value of the article P from the electric signal generated by the weighing unit 4, an unit for adjusting the zero point from the electric signal generated by the weighing unit 4, an unit for storing each signal and each information (a storage unit), and the like.

Figure 2:
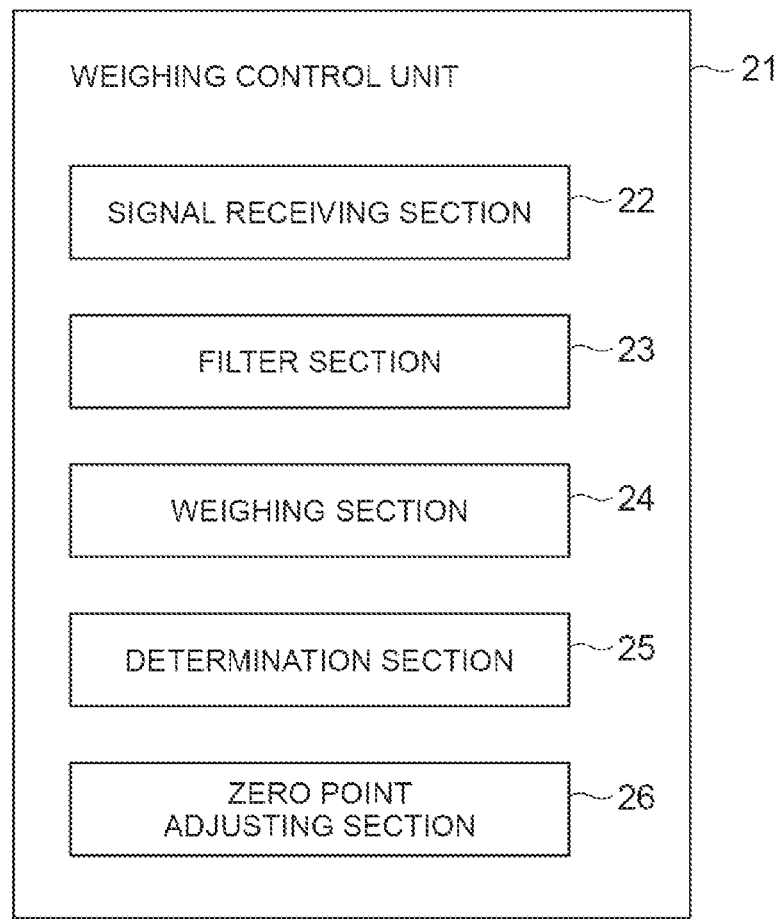
FIG. 2 is a diagram showing a functional configuration of a part of an operation unit.

Next, a partial functional configuration of the control unit 8 will be described with reference to FIG. 2. FIG. 2 is a diagram showing a functional configuration of apart of an operation unit. As shown in FIG. 2, the weighing control unit 21 included in the operation unit 6 is a part of the control unit 8 and an unit that outputs the weighing value related to the article P on the transport unit 2 by processing the original signal. Further, the weighing control unit 21 is also an unit that performs adjustment of the zero point by processing the original signal. The weighing control unit 21 includes a signal receiving section 22, a filter section 23, a weighing section 24, a determination section 25, and a zero point adjusting section 26.

The signal receiving section 22 receives the signal output from the weighing unit 4. In the present embodiment, the signal receiving section 22 receives the first digital original signal and the second digital original signal output from the weighing unit 4.

The filter section 23 removes noise from the signal by performing a filtering process on the signal received by the signal receiving section 22. The filter section 23 outputs a signal from which noise has been removed. The filter section 23 may perform a plurality of filtering processes (multi-stage filtering process) showing different characteristics for the above signals. For example, the filter section 23 includes, as a digital filter, a low-pass filter that attenuates a frequency component exceeding a frequency determined in advance, a notch filter (a band stop filter) that attenuates frequency noise of the rotating body included in the transport unit 2, a variable filter that can change the amount of attenuation in each frequency band according to the weight of the article P, and the like.

The filter section 23 includes one or a plurality of filters. The filter may be configured by any of the above digital filters, or may be configured by combining the above digital filters. The combination of the above digital filters may be made automatically or manually. The selection of each filter included in the filter section 23 may be automatically made by, for example, the control unit 8, or may be manually made by the user via the display interface 7.

In the present embodiment, the filter section 23 includes a weighing filter and a zero point adjusting filter. At least one of the weighing filter and the zero point adjusting filter is configured by combining a plurality of digital filters. In other words, at least one of a filtering process by the weighing filter and a filtering process by the zero point adjusting filter is performed by the multi-stage filter. The zero point adjusting filter has a first filter and a second filter having more stages than the first filter. Therefore, a time for applying the second filter to a signal is longer than a time for applying the first filter to the signal. The first filter is constituted by a digital filter(s) other than the low-pass filter. One of the first filter and the second filter may be the same as the weighing filter. Further, at least one of the first filter and the second filter may include all the digital filters included in the weighing filter. The selection of the weighing filter and the selection of the zero point adjusting filter may be made automatically or manually.

The weighing filter is a filter used when the weight of the article P is measured and is applied to the first digital original signal. A signal is generated by performing a filtering process using the weighing filter on the first digital original signal. The calculation signal has a signal waveform arranged for calculating the weight of the article P. Therefore, the calculation signal is referred to as a signal corresponding to the weight of the article P.

Each of the first filter and the second filter included in the zero point adjusting filter is a filter used when adjusting the zero point and is applied to the second digital original signal. A determination signal is generated by applying the first filter to the second digital original signal. The determination signal has a signal waveform arranged for determining whether or not the second digital original signal can be used for adjusting the zero point. On the other hand, an adjustment signal is generated by applying at least the second filter to the second digital original signal. In the present embodiment, the adjustment signal is generated by applying the first filter and the second filter to the second digital original signal. That is, in the present embodiment, the adjustment signal is generated by applying the second filter to the determination signal. The adjustment signal has a signal waveform arranged to adjust the zero point.

The signal waveform of the determination signal is likely to retain noise that is constantly generated (steady noise) as compared with the signal waveform of the adjustment signal. On the other hand, since the second filter has a lower responsiveness than the first filter, the signal waveform of the adjustment signal is likely to be easily shifted due to suddenly generated noise (sudden noise, impulse noise). The steady noise is, for example, noise generated by driving the transport unit 2, noise generated by driving an apparatus different from the weighing apparatus 1, or the like. The sudden noise is, for example, noise generated by an unexpected collision of the operator with the weighing apparatus 1, noise caused by unexpected floor vibration, noise generated by fluctuation of the passing time of the sensors S1 and S2, or the like. In a case where the weighing apparatus 1 is disposed on the production line for manufacturing the article P, noise generated during maintenance of other apparatuses included in the production line is also a kind of sudden noise. The sudden noise is generated for a short time as compared with the steady noise and is often a large vibration.

The weighing section 24 measures the weight of the article P using the calculation signal output from the filter section 23. The weighing section 24 outputs the weight of the weighed product P to other portions of the control unit 8. The control unit 8 determines whether or not the weight of the article P deviates from the appropriate range set in advance. According to this determination result, as described above, the control unit 8 outputs an operation signal to a distributor, for example.

The determination section 25 determines whether or not to adjust the zero point on the basis of the determination signal output from the filter section 23. The determination section 25 determines whether or not a peak included in the determination signal exceeds a predetermined threshold value, for example. More specifically, the determination section 25 determines whether or not a determination value (a maximum value−a minimum value) obtained by subtracting a minimum value from a maximum value of a data group included in the determination signal exceeds a predetermined threshold value, for example. In a case where the determination value does not exceed a predetermined threshold value, the determination section 25 determines that the zero point is to be adjusted. On the other hand, in a case where the determination value exceeds a predetermined threshold value, the determination section 25 determines that the zero point is not to be adjusted. In this case, the weighing control unit 21 does not adjust the zero point until a predetermined time has elapsed from the determination. The predetermined time is, for example, 1 second or more and 5 seconds or less.

The zero point adjusting section 26 adjusts the zero point of the weighing apparatus 1 on the basis of the adjustment signal output from the filter section 23. The zero point adjusting section 26 adjusts the zero point according to a period set on the basis of the detection results of the sensors S1 and S2, for example. The zero point adjusting section 26 may adjust the zero point during the idle operation of the transport unit 2, or may adjust the zero point when the article P is being transported by the transport unit 2 while the transport unit 2 is in operation.

Figure 3:
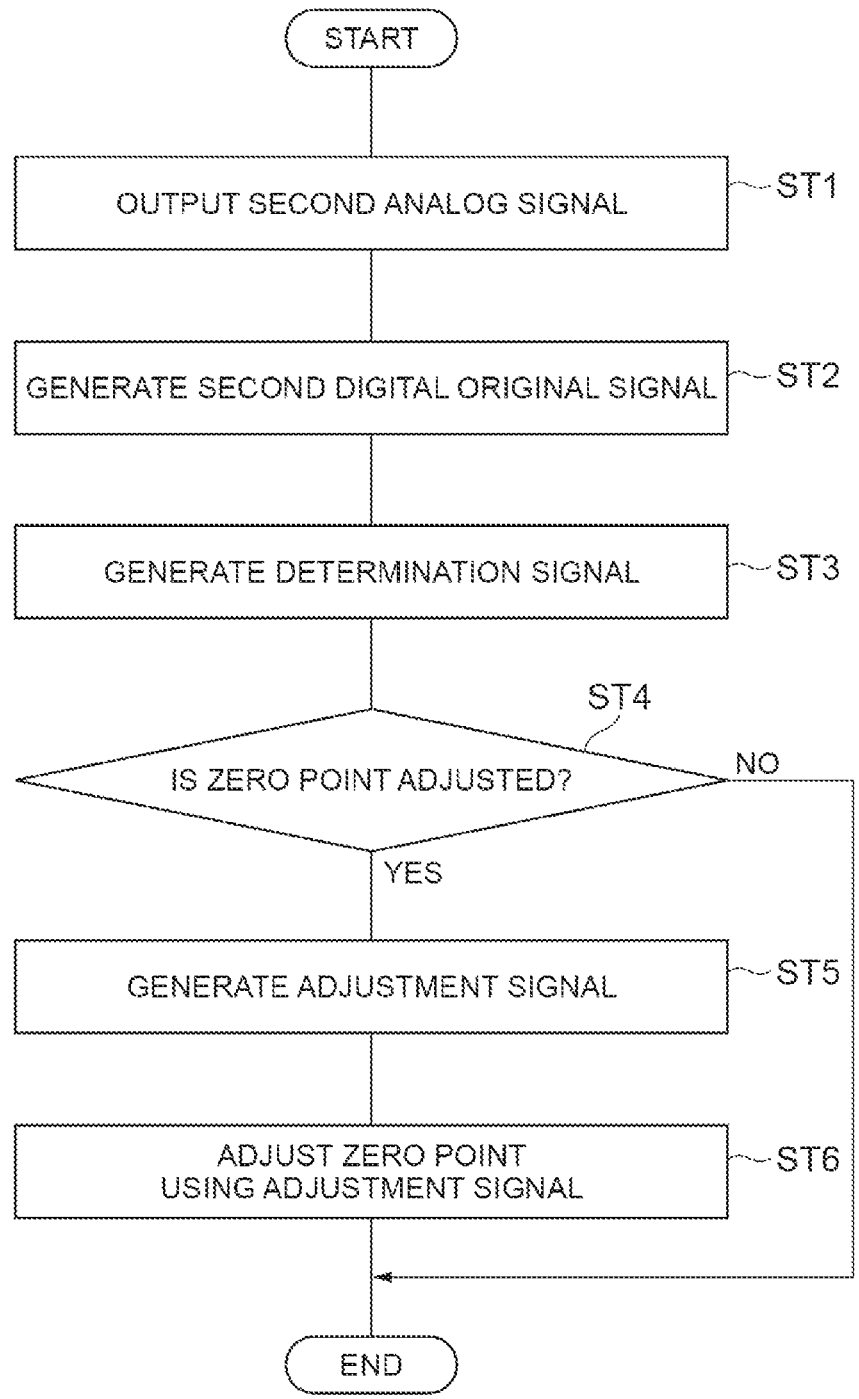
FIG. 3 is a flowchart for explaining a method of adjusting a zero point.

Next, an example of a method of adjusting a zero point by the weighing apparatus 1 according to the present embodiment will be described with reference to FIG. 3. FIG. 3 is a flowchart for explaining a method of adjusting a zero point.

First, when the article P is not transported by the second conveyor unit 2b while the transport unit 2 is in operation (during a so-called idle operation), the second analog signal is output from the weighing cell 12 (a first step ST1). In the first step ST1, first, an idle operation state of the transport unit 2 is determined on the basis of the detection results of the sensors S1 and S2. Then, the second analog signal which is an electric signal obtained by the weighing unit 4 is output during the idle operation of the transport unit 2.

Next, a second digital original signal is generated from the second analog signal (a second step ST2). In the second step ST2, the A/D conversion section of the weighing unit 4 converts the second analog signal into the second digital original signal.

Figure 4A:
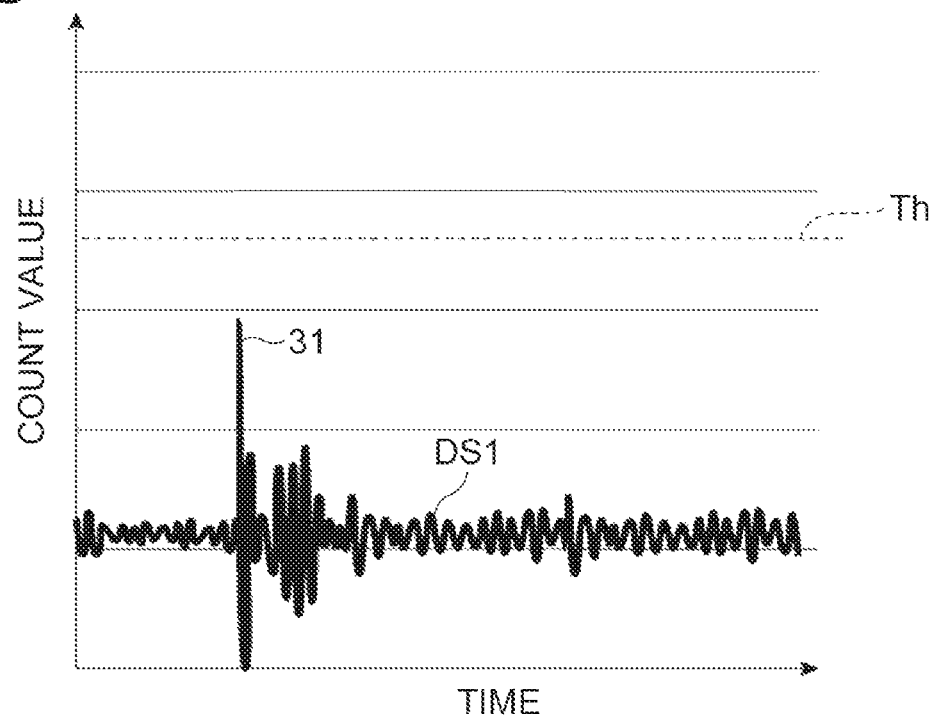
FIGS. 4A and 4B are graphs each showing an example of a determination signal.
Figure 4B:
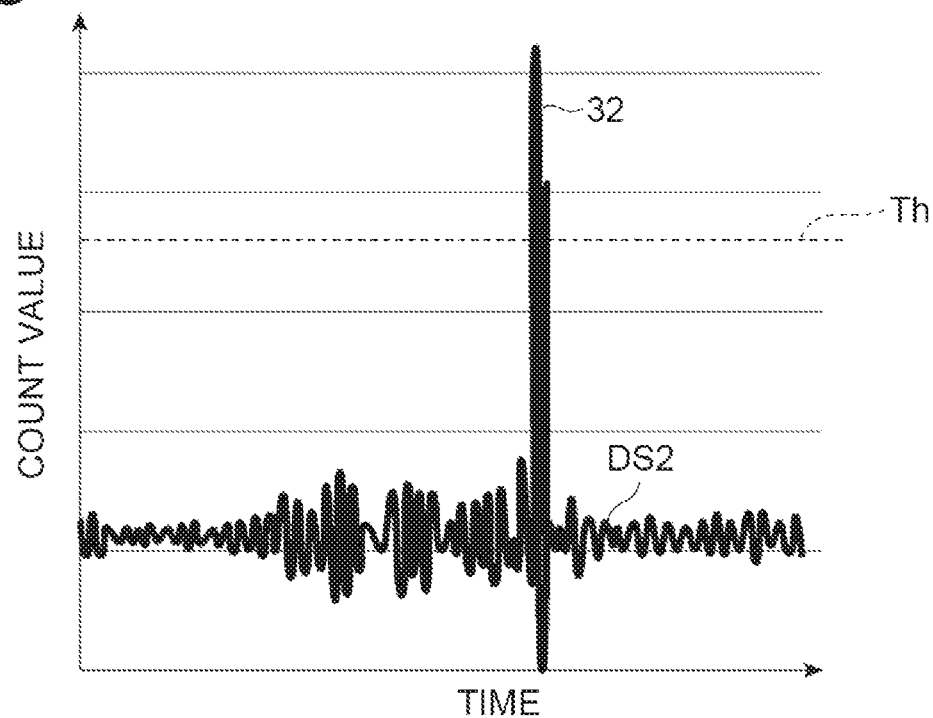

Next, the determination signal is generated from the second digital original signal (a third step ST3). In the third step ST3, the filter section 23 of the weighing control unit 21 applies the first filter to the second digital original signal to generate the determination signal. FIGS. 4A and 4B are graphs each showing an example of a determination signal. In the graphs shown in FIGS. 4A and 4B, a horizontal axis represents time and a vertical axis represents a count value. A determination signal DS1 shown in FIG. 4A and a determination signal DS2 shown in FIG. 4B are generated from the second digital original signal output at different timings from each other. A part of the determination signal DS1 includes a peak 31 caused by steady noise, and a maximum value of the peak 31 is less than a threshold value Th. On the other hand, a part of the determination signal DS2 includes a peak 32 caused by sudden noise, and a maximum value of the peak 32 exceeds the threshold value Th. The predetermined threshold value Th is a value that is determined in advance and is a value that can be changed via the display interface 7 or the like.

Next, it is determined whether or not to adjust the zero point on the basis of the determination signal (a fourth step ST4). In the fourth step ST4, for example, in a case where the data group included in the determination signal does not have a value exceeding a predetermined threshold value, the determination section 25 of the weighing control unit 21 determines that the zero point is to be adjusted using the second digital original signal. On the other hand, for example, in a case where the data group included in the determination signal has a value exceeding a predetermined threshold value, the determination section 25 determines that the zero point is not to be adjusted using the second digital original signal. Therefore, for example, in a case where the determination signal DS1 shown in FIG. 4A is used, the determination section 25 determines that the zero point is to be adjusted. On the other hand, for example, in a case where the determination signal DS2 shown in FIG. 4B is used, the determination section 25 determines that the zero point is not to be adjusted.

Figure 5:
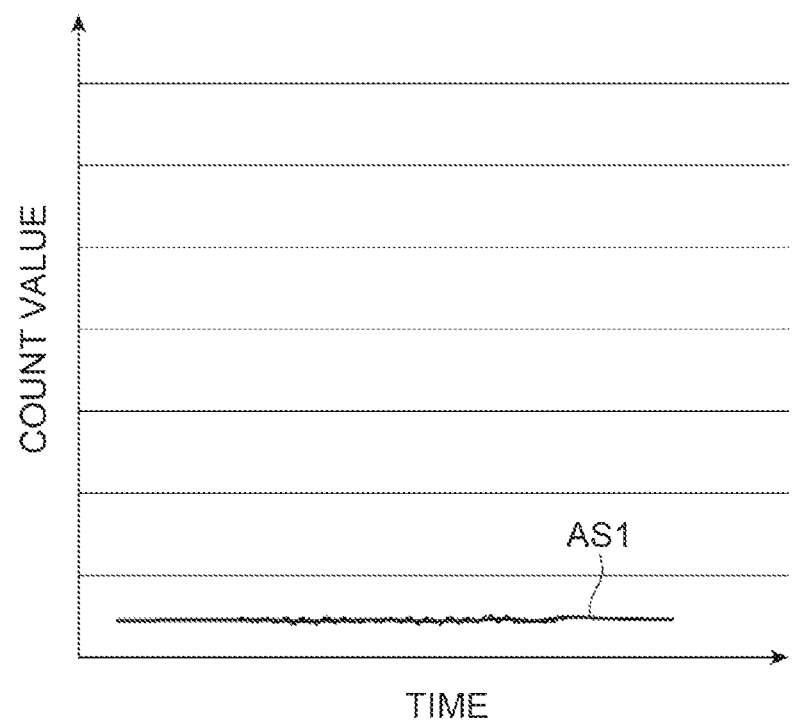
FIG. 5 is a graph showing an example of an adjustment signal.

Next, in a case where it is determined in the fourth step ST4 that the zero point is to be adjusted (YES in the fourth step ST4), the adjustment signal is generated from the determination signal (a fifth step ST5). In the fifth step ST5, the filter section 23 applies the second filter to the determination signal to generate the adjustment signal. FIG. 5 is a graph showing an example of an adjustment signal. An adjustment signal AS1 shown in FIG. 5 is obtained by applying the second filter to the determination signal DS1. Therefore, as compared with the determination signal DS1, in the adjustment signal AS1, the peak is removed, and the adjustment signal AS1 is smoothed.

Next, the zero point is adjusted using the adjustment signal (a sixth step ST6). In the sixth step ST6, the zero point adjusting section 26 adjusts the zero point after appropriately converting the count value of the adjustment signal AS1. In a case where it is determined in the fourth step ST4 that the zero point is not to be adjusted (NO in the fourth step), the fifth step ST5 and the sixth step ST6 are not performed.

Figure 6:
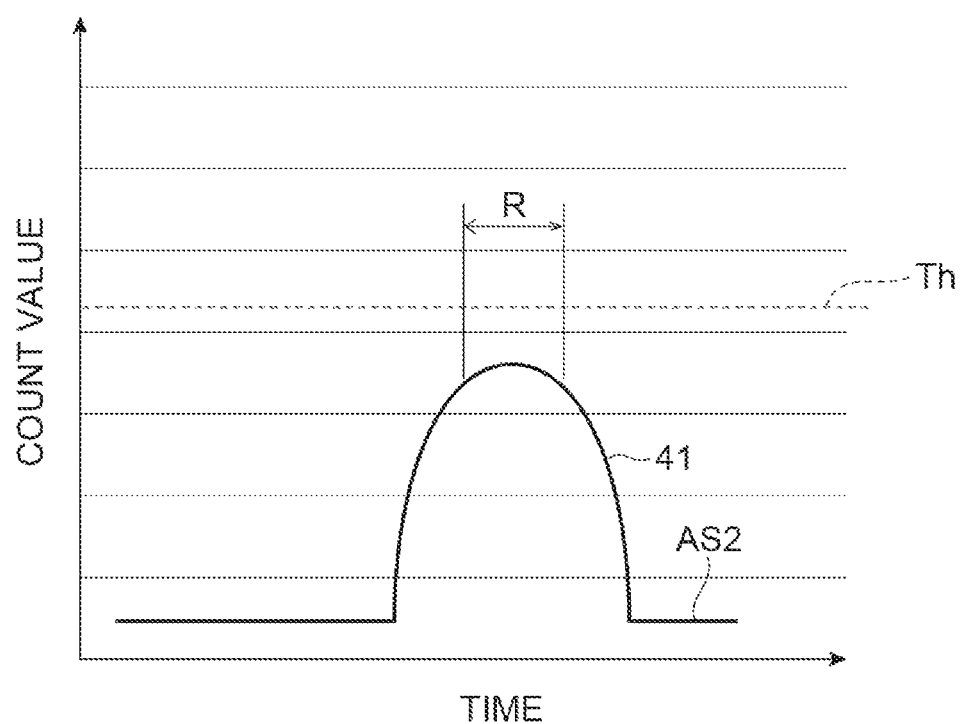
FIG. 6 is a graph showing an adjustment signal in a reference example.

The operation and effect of the weighing apparatus 1 according to the present embodiment described above will be described as compared with a reference examples which will be described below. In the reference example, it is not determined whether or not to adjust the zero point on the basis of the determination signal. Therefore, in a case where the above-mentioned determination signal DS2 is obtained, the zero point is adjusted using the adjustment signal generated on the basis of the determination signal DS2. FIG. 6 is a graph showing an adjustment signal in a reference example. An adjustment signal AS2 shown in FIG. 6 is a signal obtained by applying the second filter to the determination signal DS2. Since a responsiveness of the second filter is lower than that of the first filter, it is difficult to completely remove a sudden noise component from the adjustment signal AS2. Therefore, the adjustment signal AS2 includes a smooth peak 41 as compared with the peak 32 of the determination signal DS2. In the peak 41, an amplitude difference in a region R including a maximum value and the vicinity thereof is small. In this case, a data group included in the region R may be used for adjusting the zero point. Therefore, in a case where the zero point is adjusted on the basis of the original signal including the sudden noise, the zero point may actually deviate.

On the other hand, in the present embodiment, the weighing control unit 21 first determines whether or not to adjust the zero point on the basis of the determination signal DS1 obtained by applying the first filter having a smaller number of stages than the second filter (that is, a filter having a higher responsiveness than the second filter) to the second digital original signal. As a result, the weighing control unit 21 can accurately determine whether or not the second digital original signal includes sudden noise. Further, when adjusting the zero point, the weighing control unit 21 can accurately eliminate the second digital original signal including sudden noise. Then, the weighing control unit 21 generates an adjustment signal AS1 obtained by applying a second filter having more stages than the first filter to the original signal in a case where it is determined that the zero point is to be adjusted. As a result, the zero point adjusting section 26 can perform adjustment of the zero point on the basis of the adjustment signal AS1 from which noise has been satisfactorily removed. Therefore, the weighing apparatus 1 can accurately perform adjustment of the zero point.

In the embodiment, in a case where the peak included in the determination signal exceeds the threshold value Th, the zero point adjusting section 26 of the weighing control unit 21 determines that the zero point is not to be adjusted and does not adjust the zero point until a predetermined time has elapsed from the determination. In this case, the weighing apparatus 1 can adjust the zero point after the cause of the sudden noise is eliminated. Therefore, the weighing apparatus 1 can more accurately perform adjustment of the zero point.

In the embodiment, the first filter does not include a low-pass filter. Therefore, since the time for applying the first filter to the second digital original signal can be shortened, the determination signal is reliably generated even in a case where a period during which the original signal for adjusting the zero point can be acquired is short.

In the embodiment, the time for applying the second filter to the second digital original signal is longer than the time for applying the first filter to the second digital original signal. Further, in the present embodiment, at least one of the first filter and the second filter may be configured by combining a plurality of digital filters. In this case, it is possible to more accurately perform adjustment of the zero point.

Hereinafter, each modification example of the above embodiment will be described. In each of the following modification examples, the description of the parts that overlap those of the above embodiment will be omitted. Therefore, in the following, the parts different from those of the above embodiment will be mainly described.

Figure 7:
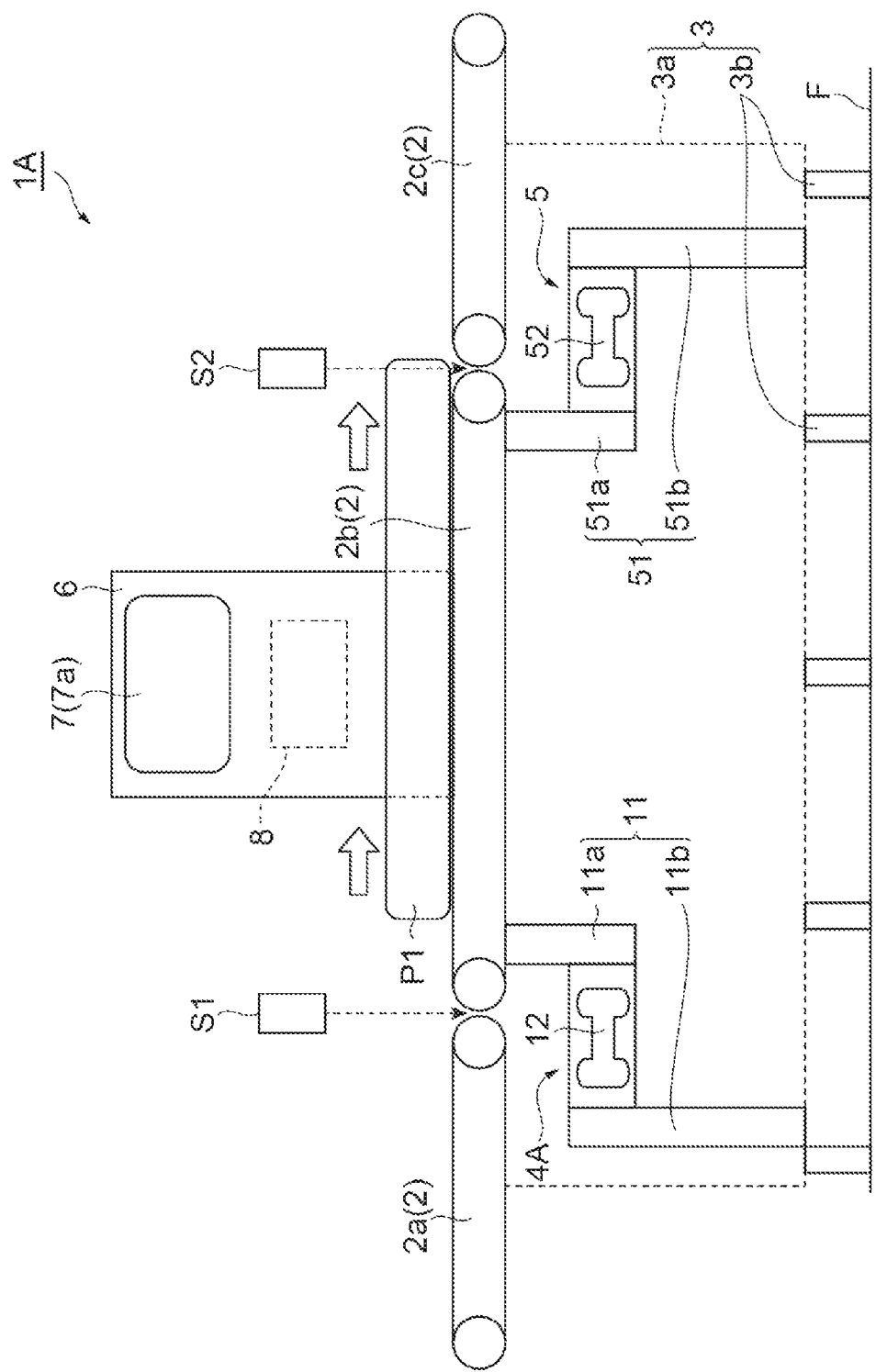
FIG. 7 is a schematic configuration view of a weighing apparatus according to a first modification example.

FIG. 7 is a schematic configuration view of a weighing apparatus according to a first modification example. As shown in FIG. 7, a weighing apparatus 1A is an apparatus for measuring a weight of a long product P1 in the transport direction and has a first weighing unit 4A and a second weighing unit 5. The first weighing unit 4A is located on an upstream side in the second conveyor unit 2b. The second weighing unit 5 is located on an downstream side in the second conveyor unit 2b and includes a strain-generating body 51 and a weighing cell 52. Similarly to the strain-generating body 11, the strain-generating body 51 includes a movable rigid body portion 51a that supports the second conveyor unit 2b and a fixed rigid body portion 51b that is fixed to the frame 3.

When the article P1 is not transported by the transport unit 2 while the transport unit 2 is in operation, in the filter section 23 of the weighing control unit 21 (see FIG. 2), the first filter included in the zero point adjusting filter is applied to each of an original signal output from the first weighing unit 4A and an original signal output from the second weighing unit 5, for example. Here, a first filter applied to the original signal output from the first weighing unit 4A and a first filter applied to the original signal output from the second weighing unit 5 may be the same as each other, or may be different from each other. Subsequently, a determination signal obtained by performing a filtering process on the original signal output from the first weighing unit 4A and a determination signal obtained by performing a filtering process on the original signal output from the second weighing unit 5 are added up. The determination section 25 of the weighing control unit 21 determines whether or not to adjust the zero point on the basis of the added-up determination signal obtained in this way. In a case where it is determined that the zero point is to be adjusted, the zero point is adjusted on the basis of an added-up adjustment signal obtained by applying the second filter to the added-up determination signal.

Alternatively, the filter section 23 of the control unit 8 may generate the added-up determination signal by applying the first filter included in the zero point adjusting filter to the original signal output from the first weighing unit 4A and the original signal output from the second weighing unit 5, for example.

The weighing apparatus 1A according to the first modification example also has the same effect as the above embodiment. In addition, according to the first modification example, the weight of the long product P1 in the transport direction can be accurately measured.

Figure 8:
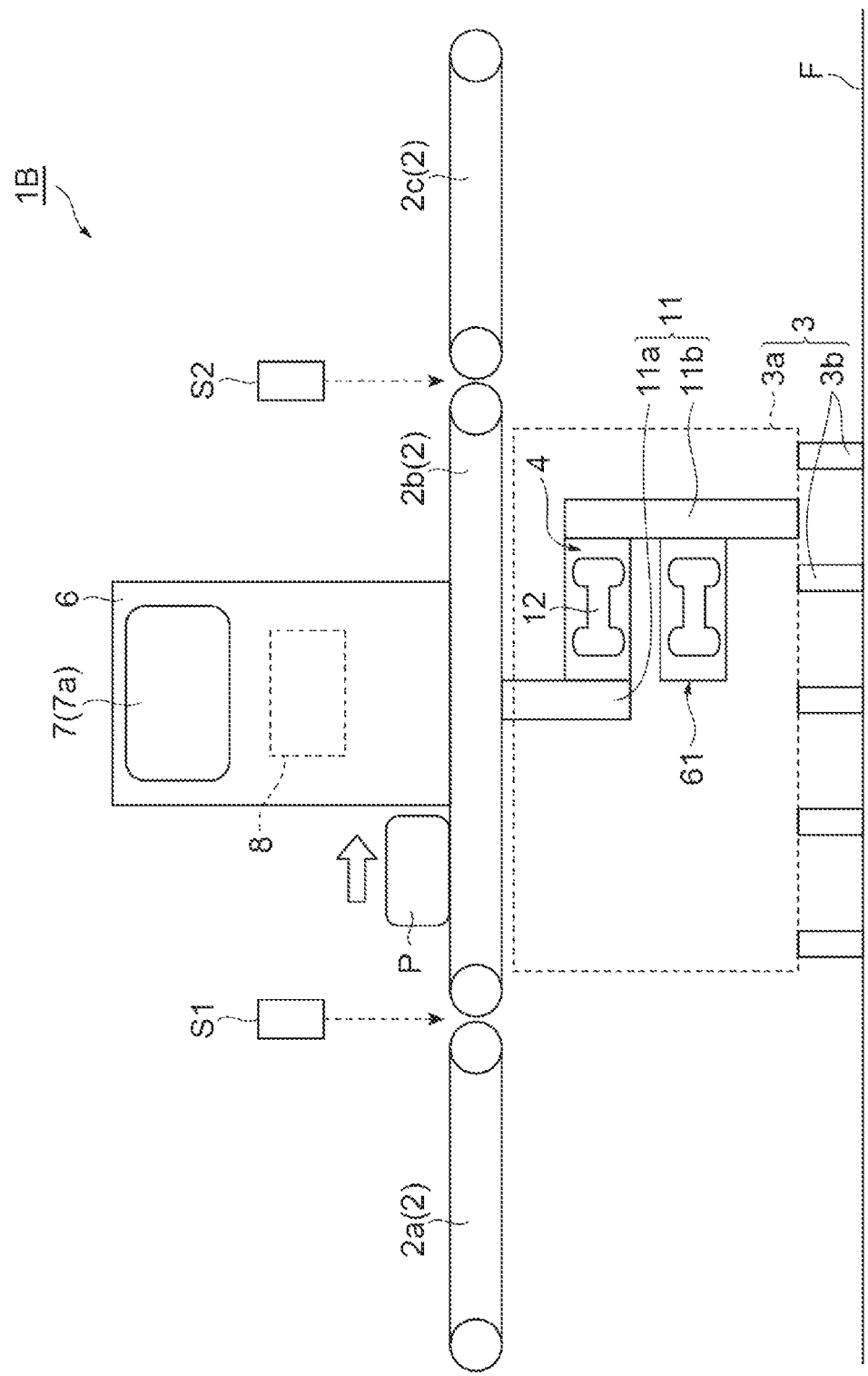
FIG. 8 is a schematic configuration view of a weighing apparatus according to a second modification example.

FIG. 8 is a schematic configuration view of a weighing apparatus according to a second modification example. As shown in FIG. 8, the fixed rigid body portion 11b of the weighing apparatus 1B is provided with an anti floor vibration (AFV) cell 61 (a disturbance vibration detection unit). The AFV cell 61 is a member that detects disturbance vibration of the weighing apparatus 1 including the weighing cell 12. The AFV cell 61 detects vibration transmitted from the floor F to the weighing apparatus 1B, vibration of the transport unit 2, and the like. The AFV cell 61 detects the disturbance vibration and outputs a vibration signal corresponding to the disturbance vibration. The vibration signal output from the AFV cell 61 is an analog signal. When the filtering process is performed on the vibration signal, a correction signal caused by the disturbance vibration is generated.

A reference value of the correction signal may be adjusted on the basis of the vibration signal obtained when the article P is not transported by the transport unit 2 while the transport unit 2 is in operation. At this time, similarly to the adjustment of the zero point shown in the above embodiment, first, it is determined whether or not the vibration signal is appropriate as a signal for adjusting the reference value. For example, the determination section 25 determines whether or not to adjust the reference value on the basis of a reference value determination signal obtained by applying a determination filter included in the filter section 23 to the vibration signal. In a case where it is determined that the reference value is to be adjusted, the reference value of the correction signal may be adjusted on the basis of a signal obtained by applying a correction filter to the reference value determination signal.

The correction filter has more stages than the determination filter. Therefore, a time for applying the correction filter to a signal is longer than a time for applying the determination filter to the signal. The determination filter may be constituted by a digital filter(s) other than the low-pass filter. One of the determination filter and the correction filter may be the same as the weighing filter. Further, at least one of the determination filter and the correction filter may include all the digital filters included in the weighing filter. The selection of the determination filter and the selection of the correction filter may be made automatically or manually. The determination filter may be the same as or different from the first filter included in the zero point adjusting filter. Further, the correction filter may be the same as or different from the second filter included in the zero point adjusting filter.

In the second modification example, the control unit 8 calculates the weight of the article P on the basis of the calculation signal output from the filter section 23 and the correction signal. Specifically, the control unit 8 subtracts the correction signal from the calculation signal to generate a calculation signal in which an error of a calculation signal caused by the disturbance vibration is corrected. Here, the characteristics of the calculation signal and the characteristics of the correction signal are different from each other. Therefore, the control unit 8 adjusts the correction signal by adding a predetermined coefficient in advance. The control unit 8 obtains the weight of the article P on the basis of the corrected calculation signal and outputs weight information indicating the weight of the article P to the display interface 7.

The above-mentioned second modification example also has the same effect as the above embodiment. In addition, when the weight of the article P is calculated with the calculation signal corrected for the error of the calculation signal caused by the disturbance vibration, the weight of the article P can be accurately measured. Further, when the determination filter is applied to the vibration signal, a signal for determining whether or not to adjust the reference value of the correction signal is first obtained. Then, it is determined whether or not the reference value is actually adjusted with the signal. As a result, it is accurately determined whether or not the vibration signal includes sudden noise. Further, when adjusting the reference value of the correction signal, it is possible to accurately eliminate the vibration signal including sudden noise. As described above, adjustment of the reference value of the correction signal can be performed on the basis of the signal from which noise has been satisfactorily removed.

Although the embodiment of the weighing apparatus according to the aspect of the present disclosure and each modification example thereof have been described above, the aspect of the present disclosure is not limited to the above embodiment and the above modification examples. For example, the above first modification example and the above second modification example may be combined with each other. In this case, it can be determined whether or not to adjust the reference value of the correction signal and the reference value of the correction signal can be adjusted on the basis of the added-up vibration signal.

In the above embodiment and the above modification examples, the weighing unit has the A/D conversion section for converting the analog signal into the digital signal and outputs the first digital original signal based on the first analog signal and the second digital original signal based on the second analog signal as the original signal, but the present disclosure is not limited to this. For example, the weighing unit may not have the A/D conversion section, and the control unit may have the A/D conversion section instead. In this case, the original signals output from the weighing unit may be the first analog signal and the second analog signal. The original signal is analog-to-digital converted, for example, by the weighing control unit. In this case, for example, the digital filter included in the filter section may have an A/D conversion filter, and the A/D conversion filter may be applied to the original signal. Here, the first filter of the zero point adjusting filter may include the A/D conversion filter. Alternatively, the first filter may be the A/D conversion filter.

In the above embodiment and the above modification examples, the adjustment signal is generated by applying the second filter to the determination signal, but the present disclosure is not limited to this. The adjustment signal may be generated by applying at least the second filter to the original signal output from the weighing unit. In this case, the second filter may include a part or all of the digital filters included in the first filter.

In the above embodiment and the above modification examples, the adjustment signal is generated after it is determined in the fourth step that the zero point is to be adjusted, but the present disclosure is not limited to this. For example, the adjustment signal may be generated before the fourth step. In this case, the generation of the adjustment signal may be performed at the same time as the generation of the determination signal, or may be performed during the determination of whether or not to adjust the zero point. As a result, the fourth step can be performed during the generation of the adjustment signal, and thus the time required for adjusting the zero point can be shortened.

In the above embodiment and the above modification examples, in a case where the determination section determines that the zero point is not to be adjusted, the weighing control unit does not adjust the zero point until a predetermined time has elapsed from the determination, but the present disclosure is not limited to this. For example, in a case where it is determined that the zero point is not to be adjusted, the determination section may generates another determination signal obtained by applying the first filter to another original signal output after the determination signal is acquired. Further, also in this case, the zero point adjusting section can adjust the zero point without using the original signal which may include sudden noise. Therefore, it is possible to more accurately perform adjustment of the zero point.

In the above embodiment and the above modification examples, in a case where a maximum value of a peak included in a determination signal exceeds a predetermined threshold value, the determination signal and an original signal for generating the determination signal are not used for adjusting the zero point, but the present disclosure is not limited to this. For example, adjustment of the zero point may be performed using the signal from which the data in the above peak and the vicinity thereof is removed. In this case, the weighing control unit may specify a generation timing of a peak exceeding a predetermined threshold value among peaks included in the determination signal, delete data generated during a predetermined period including the generation timing from the adjustment signal, and perform adjustment of the zero point on the basis of the adjustment signal from which the data has been deleted. As a result, the zero point can be adjusted from the adjustment signal from which sudden noise has been removed in advance. Therefore, it is possible to more accurately perform adjustment of the zero point. The generation timing of a peak corresponds to, for example, the time when the maximum value of the peak is obtained. Further, the predetermined period corresponds to a period from 5 seconds before the generation timing to 5 seconds after the generation timing. That is, the predetermined period is in the range of 10 seconds centered on the above generation timing.

In the above embodiment and the above modification examples, the zero point is adjusted on the basis of one adjustment signal, but the present disclosure is not limited to this. For example, the zero point may be adjusted on the basis of a plurality of adjustment signals. In this case, for example, a plurality of adjustment signals obtained at different timings may be connected. As a result, the weighing apparatus can adjust the zero point even in a case where a transport frequency of the article is high.

In the above embodiment and the above modification examples, a strain of the weighing cell is measured, but the present disclosure is not limited to this. For example, a force balance type or tuning fork type weighing cell may be used.

What is claimed is:

1. A weighing apparatus comprising:
a transport unit configured to transport an article;
a weighing unit connected to the transport unit, the weighing unit being configured to output an original signal related to a weight; and
a weighing control unit configured to output a weighing value of the article by processing the original signal,
wherein the weighing control unit is configured:
to determine whether or not to adjust a zero point on the basis of a determination signal obtained by applying a first filter to the original signal;
to generate an adjustment signal obtained by applying a second filter having more stages than the first filter to the original signal or the determination signal in a case where the weighing control unit determines that the zero point is to be adjusted; and
to perform adjustment of the zero point on the basis of the adjustment signal.

2. The weighing apparatus according to claim 1, wherein, in a case where a peak included in the determination signal exceeds a predetermined threshold value, the weighing control unit is configured:
to determine that the zero point is not to be adjusted; and
not to adjust the zero point until a predetermined time has elapsed from the determination.

3. The weighing apparatus according to claim 1, wherein, in a case where a peak included in the determination signal exceeds a predetermined threshold value, the weighing control unit is configured:
to determine that the zero point is not to be adjusted, and
to generate another determination signal obtained by applying the first filter to another original signal output after the determination signal is acquired.

4. The weighing apparatus according to claim 1, wherein the weighing control unit is configured:
to specify a generation timing of a peak exceeding a predetermined threshold value among peaks included in the determination signal,
to delete data generated during a predetermined period including the generation timing from the adjustment signal, and
to perform adjustment of the zero point on the basis of the adjustment signal from which the data has been deleted.

5. The weighing apparatus according to claim 1, wherein the first filter does not include a low-pass filter.

6. The weighing apparatus according to claim 1, wherein a time for applying the second filter to the original signal is longer than a time for applying the first filter to the original signal.

7. The weighing apparatus according to claim 1, wherein at least one of the first filter and the second filter is configured by combining a plurality of digital filters.

8. A weighing apparatus comprising:
a transport unit configured to transport an article;
a weighing unit connected to the transport unit, the weighing unit being configured to output a first original signal related to a weight;
a second weighing unit located on a downstream side in the transport unit, the second weighing unit being configured to output a second original signal related to the weight,
a weighing control unit configured to output a weighing value of the article by processing an added up original signal obtained by adding up the first original signal and the second original signal,
wherein the weighing control unit is configured:
to determine whether or not to adjust the zero point on the basis of a determination signal obtained by applying a first filter to the added up original signal;
to generate an adjustment signal obtained by applying a second filter having more stages than the first filter to the added up original signal or the determination signal in a case where the weighing control unit determines that the zero point is to be adjusted; and
to perform adjustment of the zero point on the basis of the adjustment signal.

9. The weighing apparatus according to claim 8, wherein, in a case where a peak included in the determination signal exceeds a predetermined threshold value, the weighing control unit is configured:
to determine that the zero point is not to be adjusted; and not to adjust the zero point until a predetermined time has elapsed from the determination.

10. The weighing apparatus according to claim 8, wherein, in a case where a peak included in the determination signal exceeds a predetermined threshold value, the weighing control unit is configured:
   to determine that the zero point is not to be adjusted, and
   to generate a second determination signal obtained by applying the first filter to a second added up original signal output after the determination signal is acquired.

11. The weighing apparatus according to claim 8, wherein the weighing control unit is configured:
   to specify a generation timing of a peak exceeding a predetermined threshold value among peaks included in the determination signal,
   to delete data generated during a predetermined period including the generation timing from the adjustment signal, and
   to perform adjustment of the zero point on the basis of the adjustment signal from which the data has been deleted.

12. The weighing apparatus according to claim 8, wherein the first filter does not include a low-pass filter.

13. The weighing apparatus according to claim 8, wherein a time for applying the second filter to the added up original signal is longer than a time for applying the first filter to the added up original signal.

14. The weighing apparatus according to claim 1, wherein at least one of the first filter and the second filter is configured by combining a plurality of digital filters.

15. A weighing apparatus comprising:
   a transport means for transporting an article;
   a weighing means connected to the transport means and for outputting an original signal related to a weight; and
   a weighing control unit configured to output a weighing value of the article by processing the original signal, to determine whether or not to adjust a zero point on the basis of a determination signal obtained by applying a first filter to the original signal, to generate an adjustment signal obtained by applying a second filter having more stages than the first filter to the original signal or the determination signal in a case where the weighing control unit determines that the zero point is to be adjusted, and to perform adjustment of the zero point on the basis of the adjustment signal.

16. The weighing apparatus according to claim 15, wherein the first filter does not include a low-pass filter.

17. The weighing apparatus according to claim 15, wherein a time for applying the second filter to the original signal is longer than a time for applying the first filter to the original signal.

18. The weighing apparatus according to claim 1, wherein at least one of the first filter and the second filter is configured by combining a plurality of digital filters.

* * * * *